United States Patent [19]

Locke

[11] 3,995,487
[45] Dec. 7, 1976

[54] SELF CLEANING PULLEY FOR CONVEYOR BELTS

[75] Inventor: Daniel W. Locke, South Bend, Ind.

[73] Assignee: Reliance Electric Company, Mishawaka, Ind.

[22] Filed: Sept. 8, 1975

[21] Appl. No.: 610,994

[52] U.S. Cl. .............................. 74/230; 74/230.7; 74/229
[51] Int. Cl.² ................. F16H 57/04; F16H 55/48
[58] Field of Search ............ 74/230, 230.01, 230.5, 74/230.7, 230.05, 229

[56] References Cited

UNITED STATES PATENTS

| | | | |
|---|---|---|---|
| 3,046,805 | 7/1962 | Gorp | 74/230.7 |
| 3,055,229 | 9/1962 | Mecham | 74/230 |
| 3,248,775 | 5/1966 | Morrow | 74/230.7 |
| 3,494,212 | 2/1970 | Thomson | 74/230.7 |
| 3,545,582 | 12/1970 | Kimmen | 74/230.7 |

FOREIGN PATENTS OR APPLICATIONS

| | | | |
|---|---|---|---|
| 491,724 | 3/1953 | Canada | 74/230 |

Primary Examiner—Samuel Scott
Assistant Examiner—A. Russell Burke
Attorney, Agent, or Firm—Marmaduke A. Hobbs

[57] ABSTRACT

A self cleaning pulley for conveyor belts in which a layer of elastomeric material such as polyurethane is applied to a cylindrical steel member, the layer having a plurality of generally longitudinally positioned resilient ribs extending radially outwardly from the body and spaced uniformly around the periphery thereof. The spaced ribs define generally longitudinally spaced grooves for receiving foreign material carried between the pulley and the belt. The surface of the body between the ribs slopes from a point near the longitudinal center of the pulley inwardly toward the opposite ends to assist in the flow of material dislodged from the belt and pulley to travel to the ends of the pulley where it is discharged. The ribs are resilient but firm and are of such a shape that they will produce a scraping and vibrating action on the belt to dislodge any foreign material between the pulley and belt, causing it to be moved along the grooves of the pulley and to be discharged therefrom.

13 Claims, 3 Drawing Figures

SELF CLEANING PULLEY FOR CONVEYOR BELTS

In the use of conventional belt conveyors for handling granular or particulated material, such as aggregate, coal, crushed stone and gravel, pieces of the material find their way onto the underside of the blet and are carried by the belt to one of the pulleys on which the belt is trained. These pieces are then entrapped between the belt and the periphery of the pulley as the belt travels over the pulley, frequently causing serious damage to the belt and/or pulleys. The pieces of material which sometimes adhere to either the pulleys or the underside of the belt tend to accumulate, and may cause complete failure of the conveyor belt or interfere with the operation of the conveyor system, unless special means is provided for continuously removing the material from the pulleys and belt. In order to overcome the foregoing problem, grooved or ribbed pulleys have been used which tend to scrape or vibrate the belt to dislodge the pieces of material and to discharge the loosened material at either side of the conveyor, usually at one or both ends of pulleys. These special pulleys have one of several configurations, usually consisting of spiral grooves or ribs, often in two sections, each section starting near the center of the pulley and extending to the respective end of the pulley, or consisting of ribs disposed longitudinally on the periphery of the pulley. The pieces removed by the action of the ribs either spirally or longitudinally arranged, are carried in the grooves between the ribs to the ends of the pulleys as they are dislodged from the belt. For effective action in dislodging some material from the underside of the belt, the scraping action of the spiral ribs or the scraping and shaking action of longitudinal ribs is required. The ribs on steel pulleys, while effective, sometimes cause excessive wear on both the pulleys and the belt, and may be noisy and inefficient.

In order to reduce the wear and improve the friction coefficient between the belt and pulleys, lagging, consisting of a layer of resilient material such as rubber or plastic, is applied to the steel drum of the pulleys. Spiral grooves have been used in such coated pulleys to assist in removing the particles between the belt and pulleys, and to permit the escape of water carried onto the pulleys by the belt. The foregoing ribs and grooves and lagging have failed to provide the efficiency desired with respect both to removal of the entrapped material and to the coefficient of friction in the operation of large belt conveyor systems.

It is therefore one of the principal objects of the present invention to provide a self cleaning pulley for conveyor belts which will cause both a scrapping and vibratory action between the pulley and belt for dislodging particles of material from both the belt and pulley, and which will convey the loosened material to and discharge it at the ends of the pulley.

Another object of the invention is to provide a conveyor pulley which has a plurality of spaced parallel, longitudinally arranged ribs of flexible, but firm, elastomeric material which will assist in dislodging material from the belt and pulley by flexing and yielding as the belt moves over the ribs, and which, while providing the desired vibratory action to the pulley and belt, tends to minimize the noise normally resulting from such action with the conventional or standard ribbed pulleys.

Still another object is to provide a conveyor pulley of the aforesaid type which is so constructed and designed that the ribs are formed in the lagging or an outer layer of elastomeric material applied to a steel drum and can be repaired when worn by replacing the lagging or outer layer, thus reducing the maintenance cost of the conveyor system, and which has a high coefficient of friction for driving the belt and good wear resistance to the action of the pieces of material carried between the pulley and belt during the operation of the conveyor system.

A further object of the invention is to provide a self cleaning pulley for a conveyor belt which is simple in construction and design, and which can be easily fabricated using standard equipment and techniques.

Additional objects and advantages of the present invention will become apparent from the following description and accompanying drawing, wherein.

Figure 1:
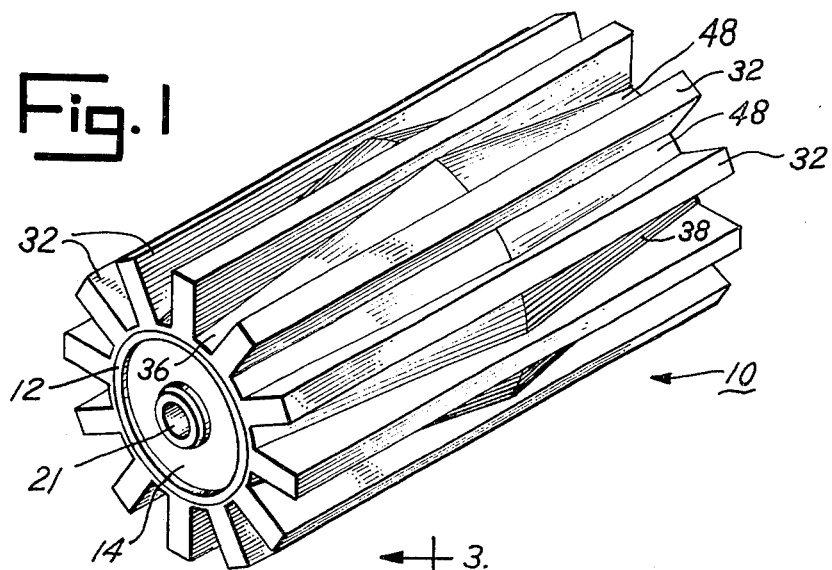
FIG. 1 is a perspective view of a conveyor pulley embodying the present invention.
Figure 2:
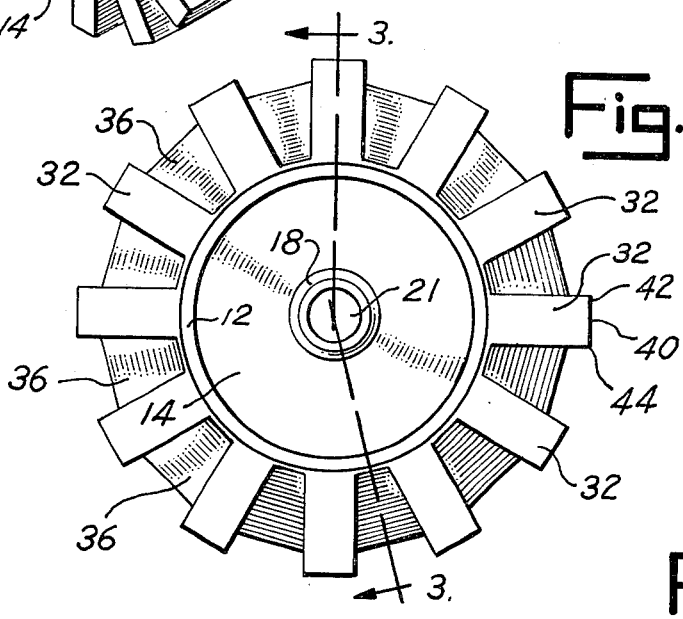
FIG. 2 is an end elevational view of the pulley shown in FIG. 1.
Figure 3:
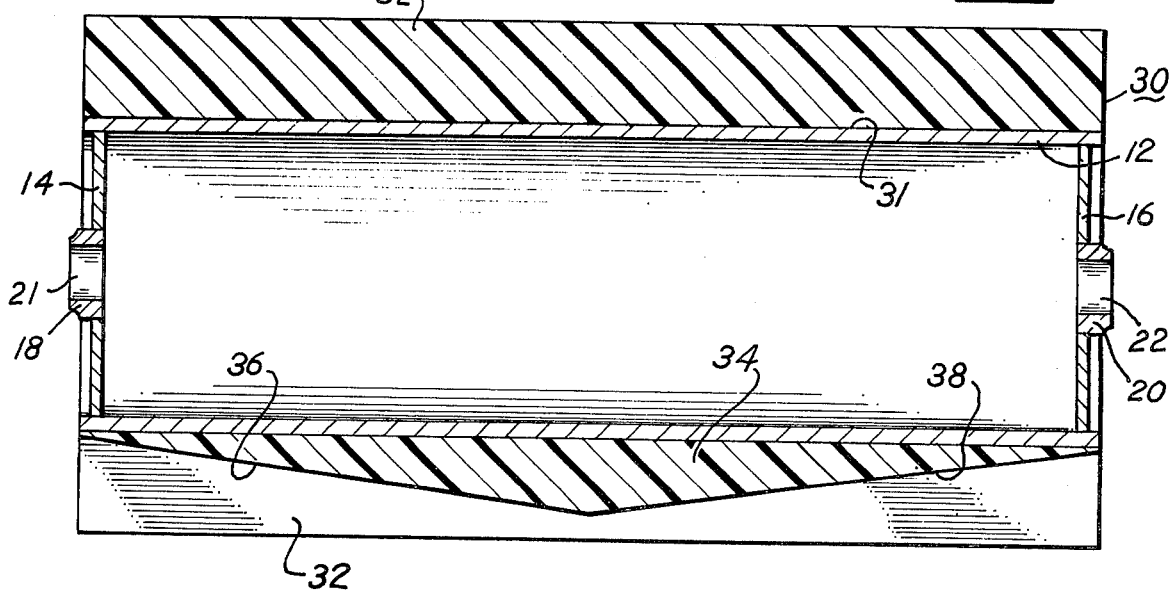
FIG. 3 is a longitudinal cross sectional view of the pulleys shown in FIGS. 1 and 2, the section being taken on line 3 — 3 of the latter figure.

Referring more specifically to the drawing, numeral 10 designates generally the present pulley, having a steel cylinder 12, and steel disc-shaped end plates 14 and 16, the two end plates 14 and 16 being secured in the respective ends of cylinder 12 by welding or other suitable securing means. Hubs 18 and 20 are mounted in the center of end plates 14 and 16 and are provided with bores 21 and 22 for receiving a shaft, extending the full length of the pulley and being journalled in pillow blocks at the ends of the pulley. The hubs may be of any type suitable for the intended use of the pulley, and may be varied from one installation to another, the ones shown only being included for the purpose of illustrating the complete pulley. The pulley embodying the present invention may be used for the drive pulley of a conveyor belt in a conveyor system, or it may be a non-driven or an idle pulley. The construction is essentially the same regardless of any one of the three uses for which the pulley may be used. The diameter and length of the pulley likewise may be changed to satisfy conveyor belt applications and to meet specific requirements.

In the embodiment of the invention illustrated in the drawing, a relatively thick outer layer 30 of polyurethane is bonded to the periphery of the cylinder at numeral 31 so that layer 30 becomes, in effect, an integral part of the basic pulley structure. While polyurethane is preferred for most installations, other types of suitable elastomeric material may be used. The outer configuration of layer 30 is important in the present invention and consists of a series of ribs 32 spaced uniformly around the periphery of the pulley. The ribs project outwardly from a body or body portion 34 which tapers inwardly from the center toward the two ends of the pulley, thus forming two frustoconical surfaces 36 and 38 terminating at the outer ends of cylinder 12. The ribs 32 and body 34 are molded integrally to one another in a single operation, normally when layer 30 is molded and bonded to the periphery of cylinder 12. The ribs extend generally radially outwardly, and the longitudinal peripheral surfaces 40 are preferably parallel to the axis; however, they may be crowned from the ends of the pulley to the center.

Further, surfaces 40 of the ribs in the peripheral direction are preferably flat and straight, and the sides are generally radial, thus providing corners 42 and 44 on each of the ribs.

The polyurethane or other elastomeric material used for layer 30 is firm so that it does not become appreciably distorted when it is supporting a conveyor belt, but is sufficiently flexible to yield to the presence of pieces of material caught between the conveyor pulley and the belt. This prevents any appreciable damage to either the pulley or the belt. Various molding procedures may be used in constructing the present pulley and in applying the layer to the cylinder, and while bonding is normally preferred, a mechanical connection may be suitable in some installations.

In the use and operation of the pulley embodying the present invention, with the pulley installed, for example, as the drive pulley of a conveyor belt, a shaft is inserted through bores 21 and 22 of hubs 18 and 20, respectively, and the hubs are secured thereto for rotation with the shaft. The outer ends of the shaft are mounted on pillow blocks and the shaft is driven by a suitable power drive such as an electrical motor with an intervening speed reducer (not shown) for providing the drive pulley with the power for driving the belt. The conveyor belt is trained on the pulley and normally extends around approximately 180° thereof. The belt is supported on the pulley solely by ribs 32 which, because of the angular shape of the corners 42 and 44 and the frictional nature of the elastomeric material, provide an effective traction between the ribs and the inner side of the belt. As the conveyor belt is driven by the pulley to convey particulated materials on the conveyors, particles of various sizes may fall onto the inner side of the belt and be advanced into the periphery of the pulley. In view of the resilient and yieldable nature of the ribs, they yield sufficiently to permit the pieces of material to fall into the series of grooves 48 between ribs 32, and, in view of the frusto-conical shape of the surface of the two ends of layer 30, the particles migrate along the surface thereof to the end of the pulley where they are discharged, normally falling into a receptacle or other structure for receiving the dislodged material. In the normal operation of the pulley, the ribs are sufficiently firm to fully support the conveyor belt without substantial distortion; however, minor distortion constantly occurs which produces a scraping effect on the inner side of the belt as the belt passes around the pulley and also produces a slight vibrating effect on the belt. Corners 42 and 44 of the ribs further tend to scrape the inner side of the belt and dislodge any materials which may have adhered to the inner side. The ribs tend to deflect throughout their entire radial height as the belt passes over the ribs, yet the deflection is such that an effective scraping action is obtained, the deflection of the ribs occurring primarily near the outer periphery thereof and in the proximity of corners 42 and 44. Since the ribs are resilient and slightly yieldable, the noise and slapping effect of the belt is minimized so that a relatively smooth operation of the belt and the pulley is obtained.

Since some pulleys are subjected to severe operating conditions, wear may occur in the polyurethane layer, particularly at the outer edges of the ribs. In the event they become substantially worn so that their effectiveness in dislodging the material is impaired, layer 30 can be replaced, using the basic pulley structure, including cylinder 12 and end plates 14 and 16 and hubs 18 and 20. The same method is used in applying the layer in repairing the pulley as that used in fabricating the pulley structure initially.

While only one embodiment of the present self cleaning pulley for a conveyor belt has been described in detail herein, various changes and modifications may be made without departing from the scope of the invention.

I claim:

1. In a self cleaning pulley for conveyor belts, a cylindrical member and a layer of elastomeric material on the periphery of said cylindrical member, said layer having an annular body secured to the external surface of said cylindrical member and a plurality of generally longitudinally positioned resilient and flexible ribs extending radially outwardly from said body and spaced uniformly around the periphery thereof, said spaced ribs defining generally longitudinal spaced grooves for receiving foreign material caught between the pulley and the belt and for conveying such material to the ends of the pulley where it is discharged therefrom.

2. A self cleaning pulley for conveyor belts as defined in claim 1 in which the body of said elastomeric layer consists of two frusto-conically shaped sections, each section tapering from the center toward the respective end of the body, and in which said body is bonded to the external surface of said cylindrical member.

3. A self cleaning pulley for conveyor belts as defined in claim 1 in which the surface of the body of said elastomeric layer between said ribs tapers from a point near the longitudinal center of the pulley inwardly toward the end of the body in each direction.

4. A self cleaning pulley for conveyor belts as defined in claim 1 in which said outer portions of said ribs are generally rectangular in cross section and are substantially straight throughout their longitudinal length.

5. A self cleaning pulley for conveyor belts as defined in claim 2 in which said outer portions of said ribs are generally rectangular in cross section and are substantially straight throughout their longitudinal length.

6. A self cleaning pulley for conveyor belts as defined in claim 1 in which said elastomeric material of said layer is polyurethane.

7. A self cleaning pulley for conveyor belts as defined in claim 2 in which said elastomeric material of said layer is polyurethane.

8. A self cleaning pulley for conveyor belts as defined in claim 5 in which said elastomeric material of said layer is polyurethane.

9. A self cleaning pulley for conveyor belts as defined in claim 6 in which said polyurethane is bonded to the periphery of said cylindrical member.

10. A self cleaning pulley for conveyor belts comprising a cylindrical steel member, disc-shaped members at each end of said cylindrical member secured rigidly thereto, a hub disposed in the center of each end member and having a center bore for receiving a shaft, and a layer of elastomeric material on the periphery of said cylindrical member, said layer having an annular body secured to the external surface of said cylindrical member, and a plurality of generally longitudinally positioned resilient ribs extending radially outwardly from said body and spaced uniformly around the periphery thereof, said spaced ribs defining generally longitudinal spaced grooves for receiving particulated material caught between the pulley and the belt and for conveying said material to the ends of the pulley where it is discharged therefrom.

11. A self cleaning pulley for conveyor belts as defined in claim 10 in which the body of said elastomeric layer consists of two frusto-conically shaped sections, each section tapering from the center toward the respective end of the body.

12. A self cleaning pulley for conveyor belts as defined in claim 11 in which said outer portions of said ribs are generally rectangular in cross section and are substantially straight throughout their longitudinal length.

13. A self cleaning pulley for conveyor belts as defined in claim 10 in which said elastomeric material is polyurethane and said body is bonded to the external surface of said cylindrical member.

* * * * *